(12) United States Patent
Anthony et al.

(10) Patent No.: US 7,536,654 B2
(45) Date of Patent: May 19, 2009

(54) PHOTO BROWSE AND ZOOM

(75) Inventors: Colin R. Anthony, Bothell, WA (US); Martijn E. Van Tilburg, Seattle, WA (US); Justin Mann, Leavenworth, WA (US)

(73) Assignee: Microsoft Corporation, Redmond, WA (US)

( * ) Notice: Subject to any disclaimer, the term of this patent is extended or adjusted under 35 U.S.C. 154(b) by 347 days.

(21) Appl. No.: 11/347,584

(22) Filed: Feb. 6, 2006

(65) Prior Publication Data
US 2007/0182999 A1 Aug. 9, 2007

(51) Int. Cl.
G06F 3/048 (2006.01)

(52) U.S. Cl. ............... 715/838; 715/766; 715/767; 715/794; 715/796; 715/798; 715/730; 715/731; 715/732; 715/800; 715/801

(58) Field of Classification Search ........... 715/838, 715/766, 767, 794, 796, 798, 800, 801, 730, 715/731, 732
See application file for complete search history.

(56) References Cited

U.S. PATENT DOCUMENTS 4,222,660 A * 9/1980 Furuichi et al. ............... 399/82
2004/0252119 A1 * 12/2004 Hunleth et al. ............... 345/440
2005/0125826 A1 * 6/2005 Hunleth et al. ............... 725/45
2005/0134945 A1 * 6/2005 Gallagher .................... 358/527
2006/0109242 A1 * 5/2006 Simpkins .................... 345/156
2006/0150215 A1 * 7/2006 Wroblewski ................. 725/47
2006/0156240 A1 * 7/2006 Lemay et al. ................ 715/730
2006/0176403 A1 * 8/2006 Gritton et al. ............... 348/581

OTHER PUBLICATIONS

Benjamin B. Bederson, Quantum Treemaps and Bubblemaps for a Zoomable Image Browser, UIST 2001, ACM Symposium on User Interface Software and Technology, CHI Letters, 3(2), pp. 71-80.*

* cited by examiner

Primary Examiner—Kieu D Vu
Assistant Examiner—Patrick F Riegler
(74) Attorney, Agent, or Firm—Amin, Turocy & Calvin, LLP

(57) ABSTRACT

Groups of photo thumbnails are presented to the user, and where a user selects one of the thumbnails, a transition is provided replacing the group of thumbnails with the photo represented by the selected thumbnail. The photo may be displayed without cropping or stretching. In addition, a zoom/enlargement animation of the selected thumbnail is provided, and also possibly of the remaining thumbnails in the group, which then transitions into the represented photo. In addition, after or during the zooming animation, a cross-fading may occur such that the thumbnails fade out and the represented photo fades in. These types of transitions and user inputs both while the user is manually browsing thumbnails and when the user is viewing an automated slideshow of the thumbnails.

17 Claims, 3 Drawing Sheets

PHOTO BROWSE AND ZOOM

BACKGROUND

With the growing popularity of digital cameras, photos are more commonly stored electronically on computers instead of physically on paper. User interfaces have been developed to allow a user to manage and view his or her photos electronically. As part of these user interfaces, the user sometimes has the option of viewing photos as smaller, thumbnail versions.

In addition, the user is sometimes presented with the option of choosing a particular layout in which the photo thumbnails are arranged for viewing. For instance, a user may view a tiled layout where the thumbnails are arranged in rows and columns, or as a stacked view. In many such thumbnail layouts, the thumbnail versions of the photos are treated, such as by cropping and/or stretching, so as to fit within a particular frame size and shape. It is difficult for the user to easily gain an appreciation for what the associated photo will look like from the treated thumbnail.

SUMMARY

Aspects of the present disclosure are directed to presenting photo representations, such as thumbnail versions of the photos they represent, in one or more groups, or slides. Each group may have one or more such thumbnails. Where a user selects one of the thumbnails, a transition is provided to replace the group of thumbnails with the photo that is represented by the selected thumbnail. The photo may be displayed in its entirety, such that there is no cropping of the photo. In addition, the photo may be displayed such that there is no stretching to fit the region in which it is displayed.

Further aspects are directed to providing a zoom/enlargement animation of the selected thumbnail, and also possibly of the remaining thumbnails in the group, which then transitions into the represented photo. In addition, after or during the zooming animation, a cross-fading may occur such that the thumbnails fade out and the represented photo fades in.

Further aspects are directed to allowing the user to select the displayed full photo to return to the thumbnail group view. Or, the computer may automatically return the user to the thumbnail group view upon the expiration of a time period in which the user has not selected the full photo.

Still further aspects are directed to providing these types of transitions and user inputs both while the user is manually browsing thumbnails and when the user is viewing an automated slideshow of the thumbnails.

These and other aspects of the disclosure will be apparent upon consideration of the following detailed description of illustrative embodiments.

BRIEF DESCRIPTION OF THE DRAWINGS

The foregoing summary, as well as the following detailed description of illustrative embodiments, is better understood when read in conjunction with the accompanying drawings, which are included by way of example, and not by way of limitation with regard to the claimed invention.

DETAILED DESCRIPTION OF ILLUSTRATIVE EMBODIMENTS

Illustrative Computing Environment

Figure 1:
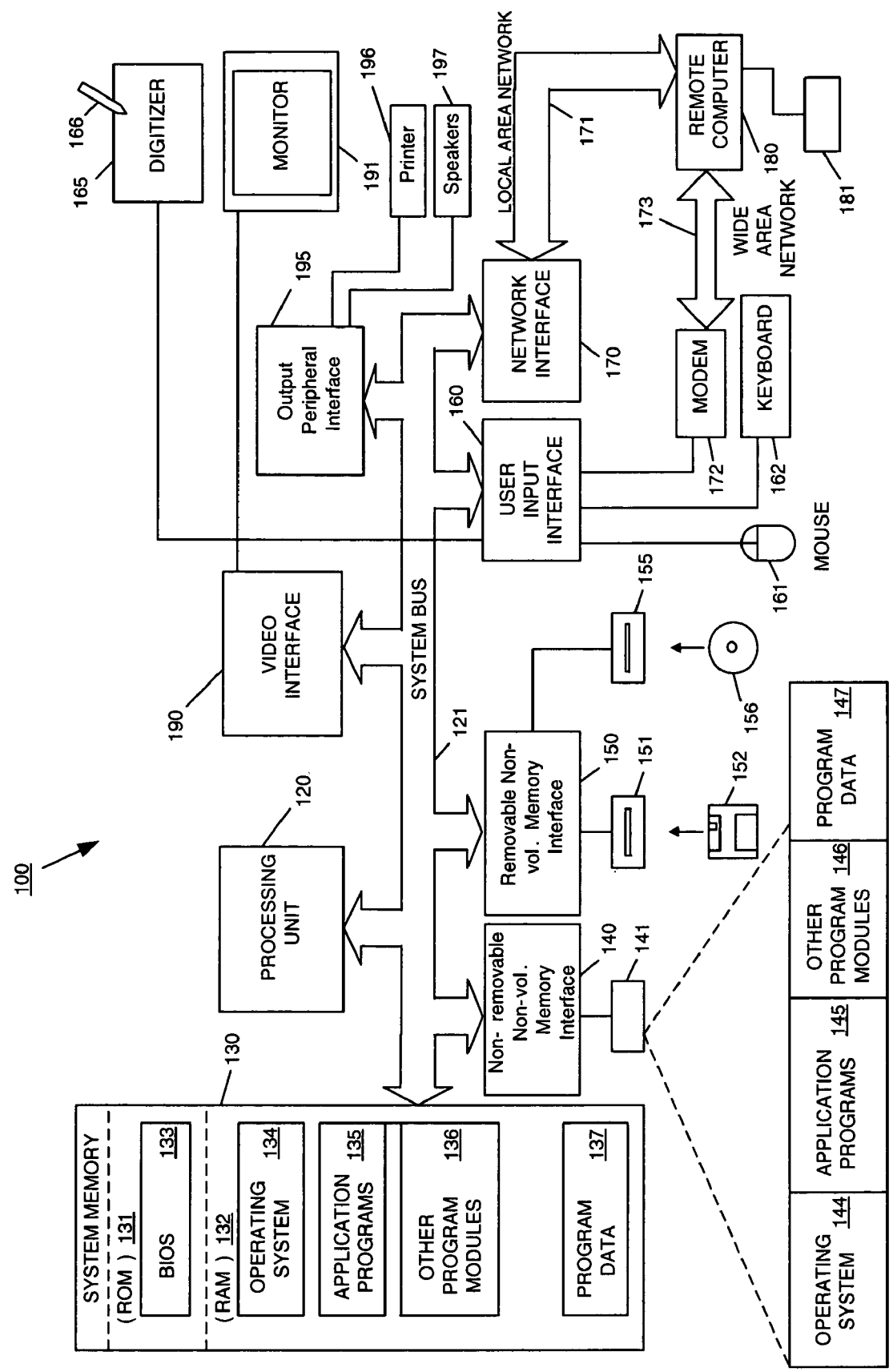
FIG. 1 is a functional block diagram of an illustrative computing environment.

FIG. 1 illustrates an example of a suitable computing system environment 100 in which aspects as described herein may be implemented. Computing system environment 100 is only one example of a suitable computing environment and is not intended to suggest any limitation as to the scope of use or functionality of various aspects as described herein. Neither should computing system environment 100 be interpreted as having any dependency or requirement relating to any one or combination of components illustrated in illustrative computing system environment 100.

One or more other general purpose or special purpose computing system environments or configurations may be used. Examples of well known computing systems, environments, and/or configurations that may be suitable include, but are not limited to, personal computers (PCs); server computers; hand-held and other portable devices such as personal digital assistants (PDAs), tablet PCs or laptop PCs; multiprocessor systems; microprocessor-based systems; set top boxes; programmable consumer electronics; network PCs; minicomputers; mainframe computers; distributed computing environments that include any of the above systems or devices; and the like.

Aspects of the disclosure herein may be described in the general context of computer-executable instructions, such as program modules, stored on one or more computer-readable media and executable by a computer. Generally, program modules include routines, programs, objects, components, data structures, etc. that perform particular tasks or implement particular abstract data types. Embodiments discussed herein may also be operational with distributed computing environments where tasks are performed by remote processing devices that are linked through a communications network. In a distributed computing environment, program modules may be located in both local and remote computer-readable media including memory storage devices.

With reference to FIG. 1, illustrative computing system environment 100 includes a general purpose computing device in the form of a computer 100. Components of computer 100 may include, but are not limited to, a processing unit 120, a system memory 130, and a system bus 121 that couples various system components including system memory 130 to processing unit 120. System bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Advanced Graphics Port (AGP) bus, and Peripheral Component Interconnect (PCI) bus, also known as Mezzanine bus.

Computer 100 typically includes a Variety of computer-readable media. Computer readable media can be any available media that can be accessed by computer 100 such as volatile, nonvolatile, removable, and non-removable media. Computer-readable media are tangible media, and may include volatile, nonvolatile, removable, and non-removable media implemented in any method or technology for storage of information such as Computer-readable instructions, data structures, program modules or other data. For example, computer-readable media includes random-access memory (RAM), read-only memory (ROM), electrically-erasable programmable ROM (EEPROM), flash memory or other memory technology, compact-disc ROM (CD-ROM), digital video disc (DVD) or other optical disk storage, magnetic cassettes, magnetic tape, magnetic disk storage or other magnetic storage devices, or any other medium which can be used to store the desired information and which can accessed by computer 100. Any single computer-readable medium, as well as any combination of multiple computer-readable media, are both intended to be included within the scope of the term "computer-readable medium" as described and claimed herein. Any single computer-readable medium, as well as any combination of multiple computer-readable media, are both intended to be included within the scope of the term "computer-readable medium" as described and claimed herein.

System memory 130 includes computer-readable storage media in the form of volatile and/or nonvolatile memory such as ROM 131 and RAM 132. A basic input/output system (BIOS) 133, containing the basic routines that help to transfer information between elements within computer 100, such as during start-up, is typically stored in ROM 131. RAM 132 typically contains data and/or program modules that are immediately accessible to and/or presently being operated on by processing unit 120. By way of example, and not limitation, FIG. 1 illustrates software in the form of computer-executable instructions, including operating system 134, application programs 135, other program modules 136, and program data 137.

Computer 100 may also include other computer storage media. By way of example only, FIG. 1 illustrates a hard disk drive 141 that reads from or writes to non-removable, non-volatile magnetic media, a magnetic disk drive 151 that reads from or writes to a removable, nonvolatile magnetic disk 152, and an optical disk drive 155 that reads from or writes to a removable, nonvolatile optical disk 156 such as a CD-ROM, DVD, or other optical media. Other computer storage media that can be used in the illustrative operating environment include, but are not limited to, magnetic tape cassettes, flash memory cards, digital video tape, solid state RAM, solid state ROM, and the like. Hard disk drive 141 is typically connected to system bus 121 through a non-removable memory interface such as an interface 140, and magnetic disk drive 151 and optical disk drive 155 are typically connected to system bus 121 by a removable memory interface, such as an interface 150.

The drives and their associated computer storage media discussed above and illustrated in FIG. 1 provide storage of computer-readable instructions, data structures, program modules and other data for computer 100. In FIG. 1, for example, hard disk drive 141 is illustrated as storing an operating system 144, application programs 145, other program modules 146, and program data 147. Note that these components can either be the same as or different from operating system 134, application programs 135, other program modules 136, and program data 137, respectively. Operating system 144, application programs 145, other program modules 146, and program data 147 are assigned different reference numbers in FIG. 1 to illustrate that they may be different copies. A user may enter commands and information into computer 100 through input devices such as a keyboard 162 and a pointing device 161, commonly referred to as a mouse, trackball or touch pad. Such pointing devices may provide pressure information, providing not only a location of input, but also the pressure exerted while clicking or touching the device. Other input devices (not shown) may include a microphone, joystick, game pad, satellite dish, scanner, or the like. These and other input devices are often coupled to processing unit 120 through a user input interface 160 that is coupled to system bus 121, but may be connected by other interface and bus structures, such as a parallel port, game port, universal serial bus (USB), or IEEE 1394 serial bus (FIREWIRE). A monitor 191 or other type of display device is also coupled to system bus 121 via an interface, such as a video interface 190. Video interface 190 may have advanced 2D or 3D graphics capabilities in addition to its own specialized processor and memory.

Computer 100 may also include a touch-sensitive device 165, such as a digitizer, to allow a user to provide input using a stylus 166. Touch-sensitive device 165 may either be integrated into monitor 191 or another display device, or be part of a separate device, such as a digitizer pad. Computer 100 may also include other peripheral output devices such as speakers 197 and a printer 196, which may be connected through an output peripheral interface 195.

Computer 100 may operate in a networked environment using logical connections to one or more remote computers, such as a remote computer 180. Remote computer 180 may be a personal computer, a server, a router, a network PC, a peer device or other common network node, and typically includes many or all of the elements described above relative to computer 100, although only a memory storage device 181 has been illustrated in FIG. 1. The logical connections depicted in FIG. 1 include a local area network (LAN) 171 and a wide area network (WAN) 173, but may also or alternatively include other networks, such as the Internet. Such networking environments are commonplace in homes, offices, enterprise-wide computer networks, intranets and the Internet.

When used in a LAN networking environment, computer 100 is coupled to LAN 171 through a network interface or adapter 170. When used in a WAN networking environment, computer 100 may include a modem 172 or another device for establishing communications over WAN 173, such as the Internet. Modem 172, which may be internal or external, may be connected to system bus 121 via user input interface 160 or another appropriate mechanism. In a networked environment, program modules depicted relative to computer 100, or portions thereof, may be stored remotely such as in remote storage device 181. By way of example, and not limitation, FIG. 1 illustrates remote application programs 182 as residing on memory device 181. It will be appreciated that the network connections shown are illustrative, and other means of establishing a communications link between the computers may be used.

As discussed previously, touch-sensitive device 165 may be a device separate from or part of and integrated with computer 100. In addition, any or all of the features, subsystems, and functions discussed in connection with FIG. 1 may be included in, coupled to, or embodied integrally as part of, a tablet computer. For example, computer 100 may be configured as a tablet computer or a handheld device such as a PDA where touch-sensitive device 165 would be considered the main user interface. In such a configuration touch-sensitive device 165 may be considered to include computer 100.

Tablet computers are well-known. Tablet computers interpret gestures input to touch-sensitive device 165 using stylus 166 in order to manipulate data, enter text, create drawings, and/or execute conventional computer application tasks such as spreadsheets, word processing programs, and the like. Input may not only be made by stylus 166, but also by other types of styli such as a human finger.

Electronic File System

An electronic file system may be implemented by computer 100 to manage photos and other objects stored in the various electronic media to which computer 100 has access. The file system may be part of the other program modules 136, such as a software application, and/or part of operating system 134. Using the electronic file system, the user may interact with the objects via, for instance, a graphical user interface. The graphical user interface may cause various visual features to be displayed on a display such as monitor 191. For example, the graphical user interface may include displayed representations of each object, or of a subset of the objects, stored by the electronic file system. A representation may be any visual representation such as an icon or a picture. For example, where the object is a photo, a representation of the photo may be a thumbnail of the photo itself, or a graphical icon.

The graphical user interface may also respond to user input. The user input may be received via any user input device such as mouse 161, digitizer 165 and stylus 166, and/or keyboard 162. In response to such user input, computer 100 interprets the input and determines an appropriate action, which may include adjusting what is displayed in the graphical user interface. For example, where a representation is selected by the user, computer 100 may cause the graphical user interface to visually indicate on monitor 191 that the representation has been selected.

Photo Layouts

The user may also choose to view a selected set of representations, such as photo representations. For instance, the user may open a folder of photos and wish to see the set of representations associated with those photos. Or, the user may perform a search for particular photos and wish to view the search results as a set of photo representations. Where a set of photo representations are to be viewed, they may be arranged in the graphical user interface in accordance with a selected view. The view may define any one or more aspects of how the representations are presented on the graphical user interface. For example, without listing herein every possibility, the view may define how many representations are displayed simultaneously, how representations may be grouped together and/or how many representations may be in each group, whether the representations are shown as two-dimensional representations (e.g., a simple thumbnail) or three-dimensional representations (e.g., a thumbnail photo shown at an angle), and/or the sizes of the representations. It will therefore be understood that many types of views may be provided, and that the particular views described herein are merely illustrative.

Figure 2:
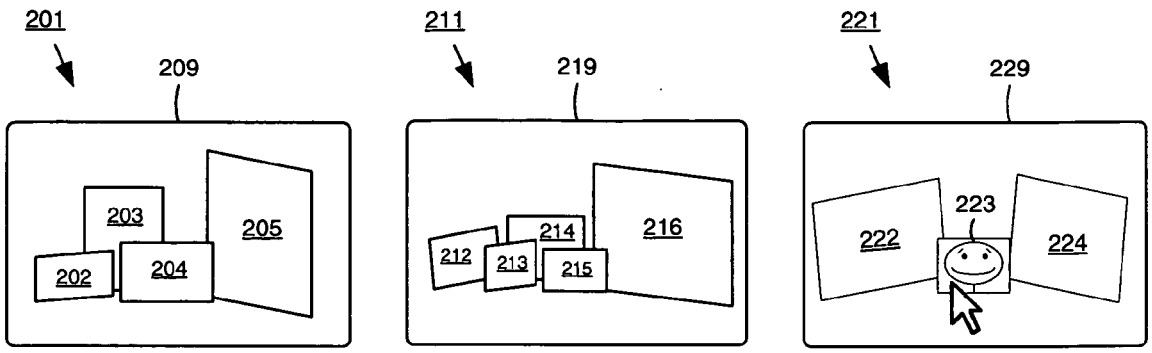
FIG. 2 is a screenshot of an illustrative plurality of mantel view groups.

One example of a view is what is referred to herein as a mantel view, or mantel layout. The mantel view shows thumbnail representations of photos in a three-dimensional manner as though the thumbnails were photographs leaning up against a wall, such as on a fireplace mantel. An example of this is shown in FIG. 2, which shows three mantel view groups 201, 211, 221. Group 201, for instance, contains four representations 202, 203, 204, 205. Some of the representations overlap, such as representation 204 overlapping representations 203 and 205, and some of the representations are shown at an angle, such as representation 205, which is angled so as to appear as though it is being viewed from the right instead of "head on" (i.e., instead of at an angle normal to the photo being represented). These effects may provide a layered three-dimensional appearance.

Figure 7:
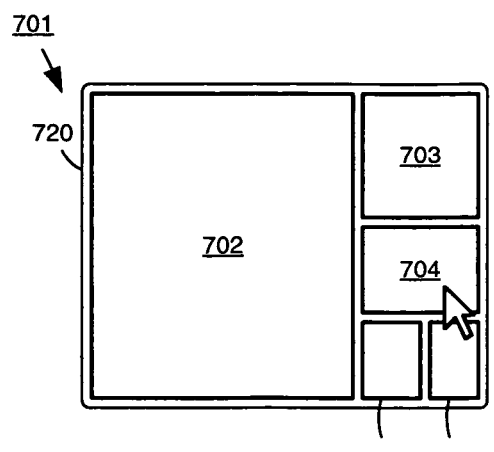
FIG. 7 is a screenshot of an illustrative magazine view groups.

Another example of a view is what will be referred to herein as the magazine view or layout. The magazine view may be considered a subset of a tiled view. In the magazine view, photo representations are arranged in one or more groups such that each representation is displayed as a two-dimensional thumbnail version of the photo with which it is associated. At least some of the representations are of different sizes relative to each other. One of the representations in each group may be larger than all of the others in that group such that the larger photo appears to the user as the main photo and the remaining photos appears to the user a supporting photos. The photo that is the main photo in a magazine view may be randomly chosen or may be chosen based on photo metadata, user preferences, and/or other factors. An example of a magazine view is shown in FIG. 7. Here, a magazine group 701 has five photo representations 702, 703, 704, 705, 706. In this example, representation 702 is the largest in group 701, representations 703 and 704 are of medium size, representation 705 is of a smaller size, and representation 706 is of the smallest size in group 701.

Photos (or photo representations) are grouped where they are arranged on the display such that they appear as a group separated from adjacent photos (or photo representations) that are not in the group by a distance that is larger than a distance between adjacent photos (or photo representations) within the group. For instance, referring again to FIG. 2, the photos in group 201 are closer to each other than to the photos in any of the other groups of FIG. 2. Additionally, each group may be bounded by a visible periphery encircling or otherwise disposed around the group and/or some other displayed feature that visually separates photos in a group from photos outside the group. For instance, in FIG. 2, a visible box 209, 219, 229 is drawn around each group 201, 211, 221, respectively, making it clear to the user how the groups are defined.

Selection and Zooming of Photos

Where the user is viewing a set of photo representations such as in FIG. 2, the user may additionally wish to view the actual photo associated with one or more of the representations. For instance, the user may select any one of the photo representations, such as representation 223, using a mouse, stylus, or other user input device. In this case, representation 223 is a thumbnail representation of the photo with which it is associated. In response to the user selection, the content displayed in the group in which the selected representation resides (in this case, group 221) zooms in. The zooming may be in a single step, in a plurality of sequential steps (with gradually increasing zoom level) or in a continuous fashion. In the latter two cases, the zooming in multiple steps or continuously would be an animation of the content displayed in group 221 to increase in size. In doing so, representation 223 and/or its surrounding environment displayed in group 221 (including representations 222 and 224) may be animated to increase in size over time.

An animation is the sequential visual presentation of a graphical feature (such as a photo representation, a set of photo representations, and/or a background) in a first state and in a different second state, as well as in at least a different third state presented in between the first and second states. For example, where a photo representation increases or decreases in size from a start size to a end size, then the representation can be animated by visually presenting the representation not only in the start and end sizes, but also in at least one intermediate size greater than the start size and smaller than the end size. In addition, the intermediate size(s) would be visually presented at a time in between the visual presentation of the start and end sizes. The visual presentation of each state may be at sequential non-overlapping times or at sequential overlapping times.

A photo representation or other graphical feature may additionally be animated to move in the display along a predetermined or non-predetermined path. In such a case, the graphical element would be displayed in at least three locations along a path, such as at each sequential incremented pixel location or other unit of movement along the path. The number of intermediate displayed positions/states along a path may depend upon the length of the path, the speed of movement along the path, and/or the desired smoothness of displayed movement. For example, a photo representation may be displayed at one hundred different sequential intermediate positions along a path over a period of several seconds to give the user the visual impression of smooth movement along the path.

Thus, in response to user selection of a photo representation, the photo representation and/or other graphical features may animate in size and/or in location. For instance, referring to FIG. 3, which is a screenshot taken at a time after FIG. 2, it can be seen that in response to the user having selected photo representation 223, photo representation 223 has increased in size to an intermediate size. And, referring to FIG. 4, which is a screenshot taken at a time after FIG. 3, photo representation 223 has continued to increase in size to a larger size. Here, only three sizes of photo representation 223 are shown in the animation illustrated in FIGS. 2-4. However, more than three total sizes may be implemented to achieve a smoother animation.

It is also noted that other graphical features in group 221 may also simultaneously increase in size along with selected photo representation 223. For instance, the remaining unselected photo representations 222 and 224 may animate to increase in size simultaneously with photo representation 223. Also, the background, or interstitial region(s), between photo representations 222, 223, 224 may also increase in size. In addition, at least one of the photo representations are animated to move to different locations. For instance, where the location of a photo representation is measured by its center, then photo representation 222 can be considered to have moved up and to the left, and photo representation 224 can be considered to have moved up and to the right By animating other features in addition to the selected representation 223, this can give the user the impression of zooming in to the graphical content of group 221. Also, where any one or more of the graphical features of group 221 are increased in size or zoomed in, the features may be cropped so as to extend up to, but not outside, boundary 229 of group 221. This is shown, for example, in FIG. 3, where photo representations 222 and 224 extend up to, but not beyond, boundary 229. Such group boundary cropping may give the user the impression that the user is looking through a frame defined by boundary 229 while the contents of the frame are being zoomed in upon.

Figure 3:
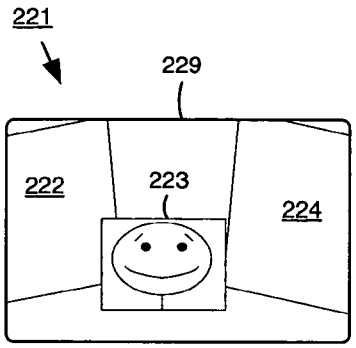
FIGS. 3 and 4 are screenshots showing the content of one of the groups of FIG. 2 animating to increase in size.
Figure 4:
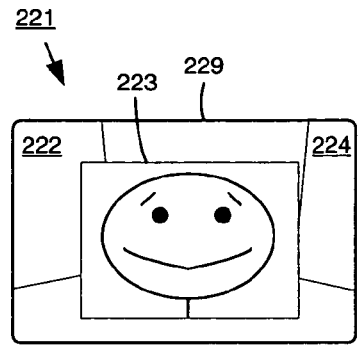
Figure 5:
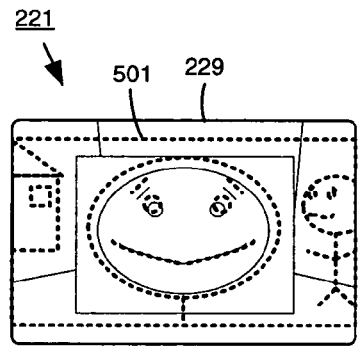
FIGS. 5 and 6 are screenshots showing the content of one of the groups of FIG. 2 cross-fading into an associated uncropped photo.

Thus far, in response to the user selection of photo representation 223, an animation has occurred as shown in FIGS. 2-4. FIG. 5 is a screenshot at a time after FIG. 4, showing how the previous graphical content of group 221 is fading out, and a new graphical feature, photo 501, is fading in. Fading in and out is indicated in FIG. 5 by broken lines. A graphical feature fades out when it gradually disappears over time by way of changing color, changing contrast, changing brightness, and/or changing transparency. A graphical feature fades in when it gradually appears over time by way of changing color, changing contrast, changing brightness, and/or changing transparency.

In this example, all of the graphical features displayed in FIG. 4 in group 221 are fading out simultaneously with photo 501 fading in. This simultaneous fading out and fading in may appear to the user as though the feature fading out is being replaced with the feature fading in. This is referred to as cross-fading.

Figure 6:
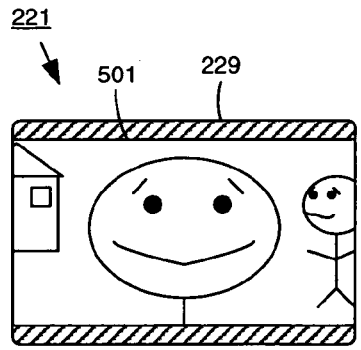

In the present example, photo representations 222, 223, and 224, as well as any other graphical features such as the background, which were previously displayed in group 221 in FIGS. 24, cross-fade with photo 501. FIG. 6 shows a screenshot taken after the cross-fading has finished, which shows that photo 501 is displayed in full while photo representations 222, 223, and 224 are no longer displayed. The cross-fading may occur while one or more features in group 201 (such as representation 223) are still animating to increase in size. This may provide a very smooth appearance to the user. Or, the cross-fading may occur only after the animation to increase in size has ceased.

As previously mentioned, each photo representation 222, 223, 224 is associated with a different photo. Here, the photo that cross-fades in or otherwise appears (photo 501) is associated with the selected photo representation (photo representation 223). If the user had selected a different representation, then an associated photo other than photo 501 would have appeared in FIGS. 5 and 6.

Although photo representation 223 may be thumbnail version of photo 501 that may be cropped and/or stretched, photo 501 as displayed in the screenshot of FIG. 6 is shown in its entirety, without any cropping or stretching. This allows the user to see the entire associated photo when selecting the photo's associated photo representation. Also, to maximize the fit of photo 501 within boundary 229, photo 501 is sized and positioned within boundary 229 so as to span across an entirety of the area within boundary 229 in at least one direction (in this case, in the left/right direction of FIG. 6). Because no stretching or cropping of photo 501 has occurred in this embodiment, there may be a space between one or two edges of photo 501 and boundary 229. In this case, there is a space both immediately above and immediately below photo 501. Alternatively, photo 501 may be cropped or stretched as desired. In that case, photo 501 may be sized, cropped, and/or stretched so as to fully fill the entire frame defined by boundary 229.

Figure 8:
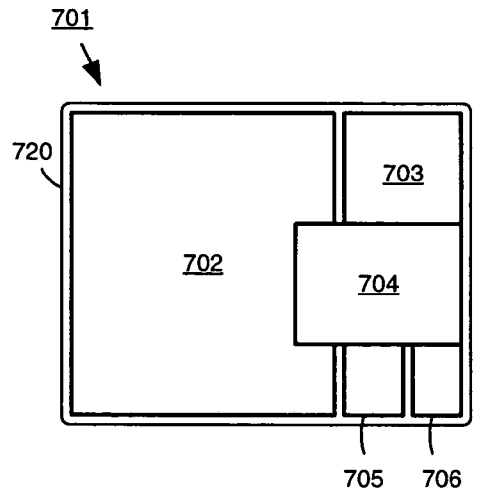
FIGS. 8 and 9 are screenshots showing one of the photo representations of FIG. 7 animating to increase in size.
Figure 9:
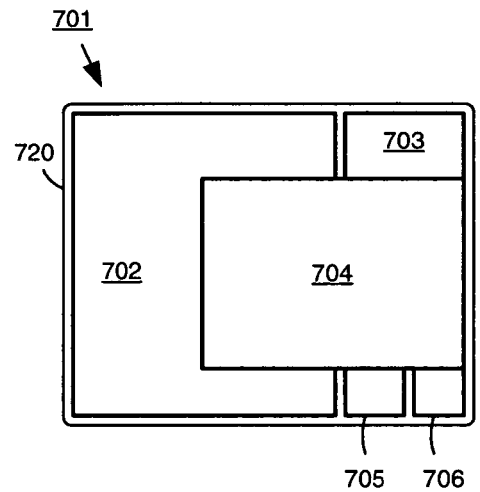

FIGS. 7-11 show a similar situation as FIGS. 2-6, except that the view of photo representations is a magazine view instead of a mantle view. Again, the zooming/enlarging features as described herein may be applied to any view having one or more displayed photo representations. Referring to FIG. 7, a magazine group 701 contains photo representations 702, 703, 704, 705, and 706 and is visually defined by a visual boundary F20. In the present example, the user selected photo representation 704. In response, as shown in FIGS. 8 and 9, photo representation 704 animates to increase in size. Although in this example none of the other photo representations 702, 703, 705, or 706 increase in size, some or all of them may also increase in size simultaneously with photo representation 704.

Figure 10:
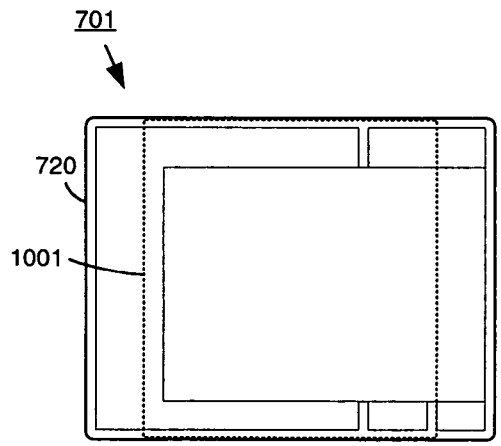
FIGS. 10 and 11 are screenshots showing the content of one of the groups of FIG. 7 cross-fading into an associated uncropped photo.
Figure 11:
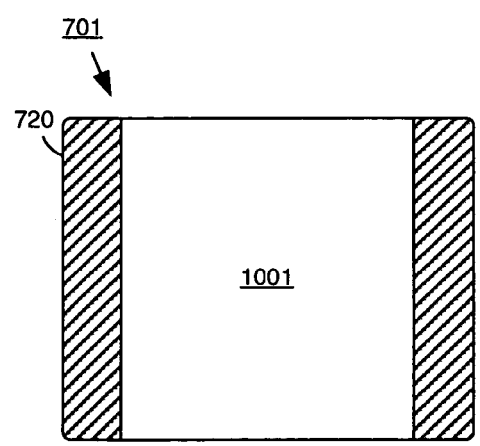

Next, referring to FIGS. 10 and 11, and also in response to the user selection of photo representation 704, photo 1001 (which is associated with selected photo representation 704), fades in while photo representations 702-706 fade out. In other words, a cross-fade occurs. As in the previous example, photo 1001 is shown in its entirety and spans in at least one direction (in this example, in the up/down direction of FIG. 11) entirely across the frame defined by boundary F20. Again, photo 1001 is displayed without any cropping or stretching, unlike it associated photo representation 704.

In both the example of FIGS. 2-6 and the example of FIGS. 7-11, a zooming-in followed by (or simultaneously with) a cross-fade has been described to occur responsive to a user selection of a photo representation. However, in either example, the zooming may be removed such that only the cross-fading or other type of appearance of the associated photo occurs. Also, in the previous examples, the associated photo has been described as spanning across, but remaining within, the boundary of the group in which the original photo representation was displayed. However, the associated photo may alternatively be displayed to span in at least one direction across the entire physical display, across an entire window provided by the operating system or a software application, or across other defined region. Moreover, responsive to user selection of a photo representation, the visible boundary defining the periphery of the group within which the photo representation resides may expand or contract. In addition, the above responses to a user selection of a photo representation may occur while the user is browsing a set of photo representations manually, or during an automatic slideshow presentation.

Regardless of the particular view in which the photo representations are displayed and how the associated photo is displayed, the user may return to the original photo representation view simply by selecting the displayed associated photo or by waiting a sufficient amount of time. For example, if the user is now at the screenshot of FIG. 6, having already selected photo representation 223, the user may now select (using a mouse, stylus, or other input device) photo 501. In response, the computer may return (either through animation, cross-fading, or instantly) to the screen of FIG. 2. Alternatively, the computer may determine that the user has not selected photo 501 within a certain amount of time, in which case the computer may decide to automatically return to the screen of FIG. 2. The amount of time may be measured from any point during or after the user input selection of photo representation 223. For example, the amount of time may be measured starting with the selection of photo representation 223, or it may be measured starting with the animation in response to the user selection, or it may be measured starting with the completion of the animation and cross-fading.

Conclusion

Thus, an improved way of browsing and viewing photos has been described, in which a user may conveniently select a photo representation, and in response a transition is presented such that the user sees the photo representation replaced with its associated entire photo without any extra treatments. This may be important where the photo representation has been treated, such as by cropping or stretching.

In discussing the above features, all actions involved, such as but not limited to, receiving user input, responding to user input, selecting, choosing, assigning, defining, calculating, displaying, animating, fading in and out, storing information, and making decisions, may be performed by the user and/or by computer 100 as instructed by software embodied as computer-executable instructions. The computer-executable instructions may be stored on a computer-readable medium such as RAM 132, ROM 131, and/or disk 156. The software may be part of operating system 134, one or more application programs 135, and/or one or more other program modules 136.

What is claimed is:

1. A computer-readable medium storing computer-executable instructions, when executed by a computer, perform the acts comprising:

displaying simultaneously a plurality of thumbnails each associated with a different photo, wherein each of the thumbnails is a reduced version of a portion of the photo associated therewith;

receiving a first user selection of one of the thumbnails; and responsive to receiving the first user selection, animating the plurality of thumbnails to increase in size simultaneously with the first user selection, causing the plurality of thumbnails to fade out, and causing an entirety of the photo associated with the selected one of the thumbnails to fade in within a visual boundary;

if a second user selection of the photo being displayed is received within a period of time after the photo has faded in, then in response to the second user selection, causing the photo to fade out, causing the plurality of thumbnails to fade in, and animating each of the plurality of thumbnails to reduce in size back to a size at which each of the plurality of thumbnails was displayed when the first user selection was received; and if the second user selection is not received within the period of time, then in response to the period of time having passed, animating the photo to fade out, causing the plurality of thumbnails to fade in, and causing each of the plurality of thumbnails to reduce in size back to a size at which each of the plurality of thumbnails was displayed when the first user selection was received, wherein the amount of time is measured staffing with selection of photo representation, staffing with animation in response to the second user selection, or staffing with completion of the animation and cross-fading.

2. The computer-readable medium of claim 1, wherein the step of displaying includes displaying the plurality of thumbnails in a frame bounded by a visible periphery, and wherein the step of causing the entirety of the photo to fade in includes displaying the entirety of the photo associated with the selected one of the thumbnails so as to span across an entirety of the frame in at least one direction.

3. The computer-readable medium of claim 1, wherein the step of displaying includes displaying the plurality of thumbnails on a display, and wherein the step of causing the entirety of the photo to fade in includes displaying the entirety of the photo associated with the selected one of the thumbnails so as to span across an entirety of the display in at least one direction.

4. The computer-readable medium of claim 1, wherein the steps further include, while the plurality of thumbnails are animating to increase in size, further animating at least one of the plurality of thumbnails to animate so as to move while the plurality of thumbnails are animating to as to increase in size.

5. The computer-readable medium of claim 1, wherein the steps further include:

receiving a second user selection of the photo being displayed;

responsive to receiving the second user selection, causing the photo to fade out, causing the plurality of thumbnails to fade in, and animating the plurality of thumbnails to reduce in size back to a size at which the selected one of the thumbnails was displayed when the first user selection was received.

6. The computer-readable medium of claim 1, wherein the step of displaying simultaneously the plurality of thumbnails includes displaying simultaneously the plurality of thumbnails in a three-dimensional view.

7. The computer-readable medium of claim 1, wherein the step of causing the plurality of thumbnails to fade out includes causing the plurality of thumbnails to fade out while the plurality of thumbnails are animating to increase in size.

8. A computer-readable medium storing computer-executable instructions, when executed by a computer, perform the acts comprising:
- displaying simultaneously a first plurality of thumbnails as a first group and a second plurality of thumbnails as a second group separate from the first group, each of the thumbnails in the first and second pluralities of thumbnails associated with a different photo, wherein each of the thumbnails is a reduced version of a portion of the photo associated therewith;
- receiving a first user selection of one of the thumbnails in the first group;
- responsive to receiving the first user selection, animating the selected one of the thumbnails in the first group to increase in size, causing the selected one of the thumbnails in the first group to fade out, and causing an entirety of the photo associated with the selected one of the thumbnails in the first group to fade in;
- receiving a second user selection of one of the thumbnails in the second group; and
- responsive to receiving the second user selection, animating the selected one of the thumbnails in the second group to increase in size, causing the selected one of the thumbnails in the second group to fade out, and causing an entirety of the photo associated with the selected one of the thumbnails in the second group to fade in; and
- if the second user selection is not received within a period of time, then in response to the period of time having passed, causing the photo to fade out, causing the selected one of the thumbnails to fade in, and animating the selected one of the thumbnails to reduce in size, wherein the amount of time is measured starting with selection of photo representation, starting with animation in response to the second user selection, or starting with completion of the animation and cross-fading.

9. The computer-readable medium of claim 8, wherein:
- the step of displaying includes displaying the first plurality of thumbnails in a first frame bounded by a first visible periphery and displaying the second plurality of thumbnails in a second frame bounded by a second visible periphery,
- the step of causing the entirety of the photo associated with the selected one of the thumbnails in the first group to fade in includes displaying the entirety of the photo associated with the selected one of the thumbnails in the first group so as to span across an entirety of the first frame in at least one direction, and
- the step of causing the entirety of the photo associated with the selected one of the thumbnails in the second group to fade in includes displaying the entirety of the photo associated with the selected one of the thumbnails in the second group so as to span across an entirety of the second frame in at least one direction.

10. The computer-readable medium of claim 8, wherein:
- the step of displaying includes displaying the first and second plurality of thumbnails on a same display,
- the step of causing the entirety of the photo associated with the selected one of the thumbnails in the first group to fade in includes displaying the entirety of the photo associated with the selected one of the thumbnails in the first group so as to span across an entirety of the display in at least one direction, and
- the step of causing the entirety of the photo associated with the selected one of the thumbnails in the second group to fade in includes displaying the entirety of the photo associated with the selected one of the thumbnails in the second group so as to span across an entirety of the display in at least one direction.

11. he computer-readable medium of claim 8, wherein the step of displaying simultaneously the first and second pluralities of thumbnails includes displaying simultaneously both the first and second pluralities of thumbnails in a three-dimensional view.

12. The computer-readable medium of claim 8, wherein:
- the step of causing the selected one of the thumbnails in the first group to fade out includes causing the selected one of the thumbnails in the first group to fade out while the selected one of the thumbnails in the first group is animating to increase in size, and
- the step of causing the selected one of the thumbnails in the second group to fade out includes causing the selected one of the thumbnails in the second group to fade out while the selected one of the thumbnails in the second group is animating to increase in size.

13. A computer-readable medium storing computer-executable instructions, when executed by a computer, perform the acts comprising:
- displaying simultaneously a plurality of thumbnails each associated with a different photo, wherein each of the thumbnails is a depiction of a portion of the photo associated therewith;
- selecting one of the thumbnails; and
- animating the selected one of the thumbnails to zoom in, causing the selected one of the thumbnails to fade out, and causing an entirety of the photo associated with the selected one of the thumbnails to fade in;
- if a user selection of the photo being displayed is received within a period of time after the photo has faded in, then in response to the user selection, causing the photo to fade out, causing the selected one of the thumbnails to fade in, and animating the selected one of the thumbnails to reduce in size; and
- if the user selection is not received within the period of time, then in response to the period of time having passed, causing the photo to fade out, causing the selected one of the thumbnails to fade in, and animating the selected one of the thumbnails to reduce in size, wherein the amount of time is measured starting with selection of photo representation, starting with animation in response to the second user selection, or starting with completion of the animation and cross-fading.

14. The computer-readable medium of claim 13, wherein the step of displaying includes displaying the plurality of thumbnails in a frame bounded by a visible periphery, and wherein the step of causing the entirety of the photo to fade in includes displaying the entirety of the photo associated with the selected one of the thumbnails so as to span across an entirety of the frame in at least one direction.

15. The computer-readable medium of claim 13, wherein the step of displaying includes displaying the plurality of thumbnails on a display, and wherein the step of causing the entirety of the photo to fade in includes displaying the entirety of the photo associated with the selected one of the thumbnails so as to span across an entirety of the display in at least one direction.

16. The computer-readable medium of claim 13, wherein the steps further include, while the selected one of the thumbnails is animating to increase in size, further causing a remainder of the plurality of thumbnails to fade out.

17. The computer-readable medium of claim 13, wherein the steps further include:
- receiving a user selection of the photo being displayed;
- responsive to receiving the user selection, causing the photo to fade out, causing the selected one of the thumbnails to fade in, and animating the selected one of the thumbnails to reduce in size back to a size at which the selected one of the thumbnails was displayed when the first user selection was received.

* * * * *